(12) United States Patent
Tsujimoto (10) Patent No.: US 8,959,897 B2
(45) Date of Patent: Feb. 24, 2015

(54) EXHAUST GAS PURIFICATION APPARATUS IN AN INTERNAL COMBUSTION ENGINE

(75) Inventor: Kenichi Tsujimoto, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1370 days.

(21) Appl. No.: 12/667,916

(22) PCT Filed: Jul. 9, 2008

(86) PCT No.: PCT/JP2008/062408
§ 371 (c)(1),
(2), (4) Date: Jan. 6, 2010

(87) PCT Pub. No.: WO2009/008450
PCT Pub. Date: Jan. 15, 2009

(65) Prior Publication Data
US 2010/0192544 A1    Aug. 5, 2010

(30) Foreign Application Priority Data
Jul. 11, 2007    (JP) .................... 2007-182005

(51) Int. Cl.
*F01N 3/00* (2006.01)
*F01N 3/10* (2006.01)
*F01N 3/08* (2006.01)
*B01D 53/94* (2006.01)
*F01N 3/20* (2006.01)

(52) U.S. Cl.
CPC .......... *F01N 3/0814* (2013.01); *B01D 53/9477* (2013.01); *F01N 3/0842* (2013.01);
(Continued)

(58) Field of Classification Search
USPC .................. 60/277, 286, 295, 297, 299, 303
See application file for complete search history.

(56) References Cited

U.S. PATENT DOCUMENTS 6,185,933 B1    2/2001    Tsuzuki et al.
2004/0083716 A1*    5/2004    Twigg .............................. 60/284
(Continued)

FOREIGN PATENT DOCUMENTS

JP    8 100632    4/1996
JP    11-62561    3/1999
(Continued)

OTHER PUBLICATIONS

Machine translation of JP2005-127257.*
(Continued)

*Primary Examiner* — Kenneth Bomberg
*Assistant Examiner* — Jason Sheppard
(74) *Attorney, Agent, or Firm* — Oblon, Spivak, McClelland, Maier & Neustadt, L.L.P.

(57) ABSTRACT

An apparatus that raises temperature of a post-catalyst at an early time while suppressing reducing agent poisoning of the post-catalyst and discharge of a reducing agent into the outside when a pre-catalyst and the post-catalyst are arranged in series in an exhaust passage of an internal combustion engine in order from an upstream side thereof. The pre-catalyst is arranged to allow an exhaust gas to flow between an outer peripheral surface thereof and an inner peripheral surface of the exhaust passage. A reducing agent addition valve adding a reducing agent to allow the reducing agent to pass through the pre-catalyst is arranged immediately upstream of the pre-catalyst in the exhaust passage. Further, a retention catalyst is arranged in the exhaust passage between the pre-catalyst and the post-catalyst, to temporarily retain the reducing agent in the exhaust gas.

8 Claims, 5 Drawing Sheets

(52) U.S. Cl.
CPC ............ F01N3/2033 (2013.01); F01N 3/2053 (2013.01); *B01D 53/9418* (2013.01); *B01D 53/944* (2013.01); *B01D 2251/208* (2013.01); *B01D 2255/91* (2013.01); *B01D 2255/912* (2013.01); *B01D 2258/012* (2013.01); *F01N 2570/12* (2013.01); *F01N 2610/03* (2013.01); *Y02T 10/26* (2013.01); *Y02T 10/24* (2013.01)
USPC ................................. 60/295; 60/297; 60/303

(56) References Cited

U.S. PATENT DOCUMENTS

| | | | |
|---|---|---|---|
| 2006/0053778 A1* | 3/2006 | Asanuma et al. | 60/295 |
| 2008/0196398 A1* | 8/2008 | Yan | 60/299 |

FOREIGN PATENT DOCUMENTS

| | | |
|---|---|---|
| JP | 2000 2133 | 1/2000 |
| JP | 2000-2138 | 1/2000 |
| JP | 2002 242665 | 8/2002 |
| JP | 2003-35135 | 2/2003 |
| JP | 3470597 | 11/2003 |
| JP | 2004 36543 | 2/2004 |
| JP | 2005 127257 | 5/2005 |
| JP | 2005 264868 | 9/2005 |
| JP | 2006 329020 | 12/2006 |
| JP | 2007-40221 | 2/2007 |

OTHER PUBLICATIONS

Notice of Reason for Rejection issued Feb. 28, 2012 in Japanese Patent Application No. 2009-522659 (with English translation).

* cited by examiner

EXHAUST GAS PURIFICATION APPARATUS IN AN INTERNAL COMBUSTION ENGINE

TECHNICAL FIELD

This application is the national phase application under 35 U.S.C. §371 of PCT international application No. PCT/JP2008/062408 filed on Jul. 9, 2008, which claims priority to Japanese patent application No. 2007-182005 filed on Jul. 11, 2007, the entire contents of each of which are incorporated herein by reference.

The present invention relates to an exhaust gas purification apparatus in an internal combustion engine.

BACKGROUND ART

In an exhaust gas purification apparatus in an internal combustion engine, a plurality of catalysts may sometimes be arranged in series to one another in an exhaust passage of the internal combustion engine and it arrange. For example, a first patent document describes a technique in which an oxidation catalyst, an HC adsorbent and an NOx purification catalyst are arranged in series in an exhaust passage of an internal combustion engine in this order from an upstream side thereof. An oxidation catalyst in this first patent document has a through hole of a large diameter formed therein. This through hole forms a bypass passage through which HC contained in an exhaust gas passes.

In addition, a second patent document describes a technique in which a reforming catalyst that reforms the fuel injected from a fuel injection means is arranged at an upstream side from an NOx storage reduction catalyst disposed in an exhaust passage. The reforming catalyst in this second patent document is disposed in the central portion of the exhaust passage, whereby a bypass passage through which an exhaust gas flows is formed on an outer periphery of the reforming catalyst.

Moreover, a third patent document discloses a construction in which a three way catalyst and a catalyst having an HC adsorption function and an HC oxidation function are arranged in an exhaust passage of an internal combustion engine in this order from an upstream side thereof.

Further, a fourth patent document discloses a construction in which two catalysts each having an HC adsorption function and an HC oxidation function are arranged in series in an exhaust passage of an internal combustion engine. In this fourth patent document, there is described a technique that controls an air fuel ratio in accordance with the state of each catalyst so as to suppress the deterioration of exhaust emission.

[First Patent Document]
Japanese patent application laid-open No. 2002-242665
[Second Patent Document]
Japanese patent application laid-open No. 2005-127257
[Third Patent Document]
Japanese patent No. 3470597
[Fourth Patent Document]
Japanese patent application laid-open No. 2000-2133

DISCLOSURE OF THE INVENTION

Problems to be Solved by the Invention

A pre-catalyst and a post-catalyst are sometimes arranged in series in an exhaust passage of an internal combustion engine in order from an upstream side thereof, and the pre-catalyst is arranged so as to allow an exhaust gas to flow through between an outer peripheral surface thereof and an inner peripheral surface of the exhaust passage. In this case, a reducing agent addition valve for adding a reducing agent so as to allow the reducing agent to pass through the pre-catalyst is arranged in the exhaust passage at a location immediately upstream of the pre-catalyst. With such an arrangement of the reducing agent addition valve, almost all of the reducing agent added from the reducing agent addition valve flows into the pre-catalyst.

In the above construction, in case where the temperature of the post-catalyst is raised, the addition of the reducing agent from the reducing agent addition valve is executed. When the reducing agent is added from the reducing agent addition valve, a part of the reducing agent thus added is oxidized in the pre-catalyst. The exhaust gas is raised in temperature by the oxidation heat generated at this time, so the post-catalyst is also raised in temperature by the exhaust gas.

Here, in the case of the above-mentioned construction, the sectional area of the pre-catalyst in a vertical direction with respect to the direction in which the exhaust gas flows therein is smaller than the sectional area of the exhaust passage in a vertical direction with respect to the direction in which the exhaust gas flows. Therefore, the flow resistance of the exhaust gas at the time when the exhaust gas passes in the pre-catalyst becomes larger, so the flow rate of the exhaust gas flowing in the pre-catalyst decreases. As a result, when the reducing agent is added from the reducing agent addition valve, the time taken for the reducing agent to pass through the pre-catalyst becomes longer, so the oxidation of the reducing agent in the pre-catalyst becomes liable to be facilitated. As a result, the temperature rise of the exhaust gas also becomes liable to be facilitated. Accordingly, it becomes possible to raise the temperature of the post-catalyst at an early time.

However, in case where the reducing agent is added from the reducing agent addition valve when the temperature of the pre-catalyst is relatively low, the amount of the reducing agent slipping or passing through the pre-catalyst without being oxidized therein increases. As a result, there is fear that reducing agent poisoning might occur in which the performance of the post-catalyst might be decreased due to an increased amount of the reducing agent adhering to the post-catalyst, or the amount of the reducing agent that is released to the outside while slipping through the post-catalyst increases.

The present invention has been made in view of the above-mentioned problem, and has for its object to provide a technique which is capable of raising the temperature of a post-catalyst at an early time while suppressing the reducing agent poisoning of the post-catalyst and the release of the reducing agent to the outside.

Means for Solving the Problems

In the present invention, a pre-catalyst and a post-catalyst are arranged in series in an exhaust passage of an internal combustion engine in order from an upstream side thereof, and the pre-catalyst is arranged so as to allow an exhaust gas to flow through between an outer peripheral surface thereof and an inner peripheral surface of the exhaust passage. In addition, a reducing agent addition valve for adding a reducing agent so as to allow the reducing agent to pass through the pre-catalyst is arranged at a location immediately upstream of the pre-catalyst in the exhaust passage. Further, in the exhaust passage between the pre-catalyst and the post-catalyst, there is arranged a retention catalyst that has a function to temporarily retain the reducing agent in an exhaust gas.

More specifically, an exhaust gas purification apparatus in an internal combustion engine according to the present invention is characterized by comprising:

a pre-catalyst that has an oxidation function and is arranged in an exhaust passage of the internal combustion engine in such a manner that an exhaust gas can flow through between an outer peripheral surface thereof and an inner peripheral surface of said exhaust passage;

a post-catalyst that has an oxidation function and is arranged in the exhaust passage at a downstream side of the pre-catalyst;

a reducing agent addition valve that is arranged at a location immediately upstream of said pre-catalyst in said exhaust passage, and adds, when raising the temperature of said post-catalyst, a reducing agent in such a manner that the reducing agent pass through said pre-catalyst; and a retention catalyst that is arranged at a downstream side of said pre-catalyst and at an upstream side of said post-catalyst in said exhaust passage, and has a function to temporarily retain the reducing agent in the exhaust gas.

In the present invention, when the reducing agent added from the reducing agent addition valve so as to raise the temperature of the post-catalyst has slipped through the pre-catalyst, the reducing agent thus having slipped is temporarily retained in the retention catalyst. During the time when the reducing agent is temporarily retained in the retention catalyst, the temperature of the post-catalyst rises in accordance with the temperature rise of the pre-catalyst. Therefore, when the reducing agent temporarily retained in the retention catalyst is released, the reducing agent is supplied to the post-catalyst of which the temperature has risen.

Accordingly, according to the present invention, the post-catalyst can be raised in temperature at an early time while suppressing the reducing agent poisoning of the post-catalyst and the release of the reducing agent to the outside.

In the present invention, the retention catalyst may be a reducing agent adsorption oxidation catalyst that has an oxidation function and a reducing agent adsorption function.

In this case, the reducing agent slipping through the pre-catalyst is adsorbed by the reducing agent adsorption oxidation catalyst. Then, the reducing agent adsorbed by the reducing agent adsorption oxidation catalyst is oxidized due to the rising in temperature of the reducing agent adsorption oxidation catalyst in accordance with the temperature rise of the pre-catalyst.

Thus, according to the above-mentioned construction, the post-catalyst can be raised in temperature at an earlier time while suppressing the reducing agent poisoning of the post-catalyst and the release of the reducing agent to the outside.

In case where the retention catalyst is a reducing agent adsorption oxidation catalyst, when the post-catalyst is raised in temperature, an amount of addition of the reducing agent per unit time in a period of time from the start of the addition of the reducing agent from the reducing agent addition valve to a predetermined timing may be made less than an amount of addition of the reducing agent per unit time after the predetermined timing.

According to this, during the time when the temperature of the pre-catalyst is relatively low, the amount of the reducing agent supplied to the pre-catalyst per unit time is small as compared with the time when the temperature of the pre-catalyst is relatively high. Accordingly, the amount of the reducing agent slipping through the pre-catalyst can be suppressed. As a result, the reducing agent poisoning of the post-catalyst and the release of the reducing agent to the outside can be suppressed more effectively.

In addition, according to the above, the amount of the reducing agent supplied to the pre-catalyst increases as the temperature of the pre-catalyst rises. Accordingly, the amount of heat generated due to the oxidation of the reducing agent in the pre-catalyst increases, as a result of which the temperature rise of the post-catalyst is facilitated. Therefore, the post-catalyst can be raised in temperature at a much earlier time.

The higher the temperature of the pre-catalyst, the higher the temperature of the exhaust gas flowing in the pre-catalyst becomes, too, and the coefficient of viscosity of the exhaust gas flowing in the pre-catalyst increases accordingly. Therefore, the higher the temperature of the pre-catalyst, the smaller the flow rate of the exhaust gas passing in the pre-catalyst becomes, even if the flow rate of the exhaust gas flowing in the exhaust passage upstream of the pre-catalyst is the same. Accordingly, the time taken for the reducing agent added from the reducing agent addition valve to pass through the pre-catalyst becomes longer. As a result, the oxidation of the reducing agent becomes liable to be more facilitated in the pre-catalyst, and the reducing agent becomes less prone to pass through the pre-catalyst.

Accordingly, the predetermined timing at which the amount of addition of the reducing agent per unit time is increased during the execution of the temperature raising of the post-catalyst may be a timing at which the pre-catalyst becomes equal to or higher than a first predetermined temperature.

Here, the first predetermined temperature is a temperature at which the flow rate of the exhaust gas passing through the pre-catalyst is decreased due to the increasing coefficient of viscosity of the exhaust gas flowing in the pre-catalyst, whereby it can be determined that the amount of the reducing agent which can be oxidized in the pre-catalyst has been increased to a sufficient extent.

According to this, the amount of the reducing agent slipping through the pre-catalyst can be suppressed more effectively.

In case where the retention catalyst is a reducing agent adsorption oxidation catalyst, as the reducing agent is added from the reducing agent addition valve, the temperature of the reducing agent adsorption oxidation catalyst also rises together with the temperature of the pre-catalyst.

Accordingly, the predetermined timing at which the amount of addition of the reducing agent per unit time is increased during the execution of the temperature raising of the post-catalyst may be a timing at which the reducing agent adsorption oxidation catalyst becomes equal to or higher than a second predetermined temperature.

Here, the second predetermined temperature is a temperature at which it can be determined that the ability of oxidation of the reducing agent adsorption oxidation catalyst becomes sufficiently high.

According to this, the amount of the reducing agent slipping through the reducing agent adsorption oxidation catalyst can be suppressed. As a result, the reducing agent poisoning of the post-catalyst and the release of the reducing agent to the outside can be suppressed more effectively.

In case where the retention catalyst is a reducing agent adsorption oxidation catalyst, when the post-catalyst is raised in temperature, discharged HC increasing control that increases an amount of HC discharged from the internal combustion engine may be executed without adding the reducing agent from the reducing agent addition valve until the temperature of the pre-catalyst becomes equal to or higher than a first predetermined temperature. Then, the reducing agent may be added from the reducing agent addition valve after the temperature of the pre-catalyst becomes equal to or higher than the first predetermined temperature.

In the above case, the amount of HC discharged from the internal combustion engine to be supplied to the pre-catalyst increases until the temperature of the pre-catalyst becomes equal to or higher than the first predetermined temperature. Thus, the temperature of the pre-catalyst is raised due to the oxidation of the HC being carried out in the pre-catalyst. In addition, that portion of the HC discharged from the internal combustion engine which has not flowed into the pre-catalyst is adsorbed by the reducing agent adsorption oxidation catalyst. The HC adsorbed by the reducing agent adsorption oxidation catalyst is oxidized due to the rising in temperature of the reducing agent adsorption oxidation catalyst in accordance with the temperature rise of the pre-catalyst. Therefore, even in case where the HC supplied to the pre-catalyst is increased by increasing the HC discharged from the internal combustion engine, it is possible to suppress HC poisoning in which the performance of the post-catalyst is decreased due to an increase of the HC adhering to the post-catalyst as well as the release of HC to the outside.

In case where the retention catalyst is a reducing agent adsorption oxidation catalyst, when the reducing agent adsorption oxidation catalyst is raised in temperature, too, the reducing agent may be added from the reducing agent addition valve in such a manner that the reducing agent pass through the pre-catalyst. In this case, when the temperature of the reducing agent adsorption oxidation catalyst is raised, an amount of addition of the reducing agent per unit time in a period of time from the start of the addition of the reducing agent from the reducing agent addition valve to a predetermined timing may be made less than an amount of addition of the reducing agent per unit time after the predetermined timing.

According to this, the amount of the reducing agent slipping through the pre-catalyst can be suppressed. Therefore, an increase in the amount of adsorption of the reducing agent in the reducing agent adsorption oxidation catalyst can be suppressed. As a result, the reducing agent poisoning of the post-catalyst and the release of the reducing agent to the outside can be suppressed. In addition, according to the above, the reducing agent adsorption oxidation catalyst can be raised in temperature at an earlier time.

Moreover, the predetermined timing at which the amount of addition of the reducing agent per unit time is increased during the execution of the temperature raising of the reducing agent adsorption oxidation catalyst may be a timing at which the pre-catalyst becomes equal to or higher than the first predetermined temperature.

According to this, the amount of the reducing agent slipping through the pre-catalyst can be suppressed more effectively. Therefore, an increase in the amount of adsorption of the reducing agent in the reducing agent adsorption oxidation catalyst can be suppressed more effectively.

In case where the retention catalyst is a reducing agent adsorption oxidation catalyst, and in case where the reducing agent is added from the reducing agent addition valve in such a manner that the reducing agent pass through the pre-catalyst when the reducing agent adsorption oxidation catalyst is raised in temperature, too, at the time when the reducing agent adsorption oxidation catalyst is raised in temperature, discharged HC increasing control may be executed without adding the reducing agent from the reducing agent addition valve until the temperature of the pre-catalyst becomes equal to or higher than a first predetermined temperature. Then, the reducing agent may be added from the reducing agent addition valve after the temperature of the pre-catalyst becomes equal to or higher than the first predetermined temperature.

In this case, too, that portion of the HC discharged from the internal combustion engine which has not flowed into the pre-catalyst is adsorbed by the reducing agent adsorption oxidation catalyst. In addition, the HC adsorbed by the reducing agent adsorption oxidation catalyst is oxidized due to the rising in temperature of the reducing agent adsorption oxidation catalyst in accordance with the temperature rise of the pre-catalyst. Therefore, the HC poisoning of the post-catalyst and the release of HC to the outside are suppressed.

In case where the retention catalyst is a reducing agent adsorption oxidation catalyst, provision may further be made for a determination means that determines whether an amount of adsorption of the reducing agent in the reducing agent adsorption oxidation catalyst has exceeded an upper limit value of an allowable range. In this case, when it is determined by the determination means that the amount of adsorption of the reducing agent in the reducing agent adsorption oxidation catalyst has exceeded the upper limit value of the allowable range, the addition of the reducing agent by the reducing agent addition valve may be stopped.

According to this, it is possible to suppress the pre-catalyst having slipped through the pre-catalyst from further slipping through the reducing agent adsorption oxidation catalyst to reach the post-catalyst. Accordingly, the reducing agent poisoning of the post-catalyst and the release of the reducing agent to the outside can be suppressed more effectively.

In the present invention, the retention catalyst may be a reducing agent adsorption catalyst that has a function to adsorb the reducing agent in the exhaust gas when the temperature thereof is equal to or lower than an adsorption temperature upper limit value, and to release the reducing agent thus adsorbed when the temperature thereof is higher than the adsorption temperature upper limit value.

In this case, when the temperature of the reducing agent adsorption catalyst is equal to or lower than the adsorption temperature upper limit value, the reducing agent slipping through the pre-catalyst is adsorbed by the reducing agent adsorption catalyst. Then, the temperatures of the reducing agent adsorption catalyst and the post-catalyst rise in accordance with the temperature rise of the pre-catalyst. Therefore, when the temperature of the reducing agent adsorption catalyst rises higher than the adsorption temperature upper limit value thereby to release the reducing agent that has been adsorbed, the temperature of the post-catalyst also has risen. As a result, the reducing agent released from the reducing agent adsorption catalyst and supplied to the post-catalyst is oxidized in the post-catalyst.

Accordingly, in the above-mentioned construction, too, the post-catalyst can be raised in temperature at an early time while suppressing the reducing agent poisoning of the post-catalyst and the release of the reducing agent to the outside.

In case where the retention catalyst is a reducing agent adsorption catalyst, similar to the case where the retention catalyst is a reducing agent adsorption oxidation catalyst, when the temperature of the post-catalyst is raised, an amount of addition of the reducing agent per unit time in a period of time from the start of the addition of the reducing agent from the reducing agent addition valve to a predetermined timing may be made less than an amount of addition of the reducing agent per unit time after the predetermined timing. According to this, the reducing agent poisoning of the post-catalyst and the release of the reducing agent to the outside can be suppressed more effectively, and in addition, the post-catalyst can be raised in temperature at a much earlier time.

In the above-mentioned case, the predetermined timing at which the amount of addition of the reducing agent per unit time is increased during the execution of the temperature raising of the post-catalyst may be a timing at which the pre-catalyst becomes equal to or higher than the first predetermined temperature, similar to the case where the retention catalyst is a reducing agent adsorption oxidation catalyst. According to this, the amount of the reducing agent slipping through the pre-catalyst can be suppressed more effectively.

In case where the retention catalyst is a reducing agent adsorption catalyst, similar to the case where the retention catalyst is a reducing agent adsorption oxidation catalyst, when the post-catalyst is raised in temperature, discharged HC increasing control that increases an amount of HC discharged from the internal combustion engine may be executed without adding the reducing agent from the reducing agent addition valve until the temperature of the pre-catalyst becomes equal to or higher than a first predetermined temperature. Then, the reducing agent may be added from the reducing agent addition valve after the temperature of the pre-catalyst becomes equal to or higher than the first predetermined temperature.

In this case, too, that portion of the HC discharged from the internal combustion engine which has not flowed into the pre-catalyst is once adsorbed by the reducing agent adsorption catalyst. Then, when the temperature of the reducing agent adsorption catalyst becomes higher than the adsorption temperature upper limit value in accordance with the temperature rise of the pre-catalyst, the HC thus adsorbed is released. The released HC is oxidized in the post-catalyst of which the temperature has risen in accordance with the temperature rise of the pre-catalyst. Therefore, even in case where the HC supplied to the pre-catalyst is increased by increasing the HC discharged from the internal combustion engine, the HC poisoning of the post-catalyst and the release of HC to the outside are suppressed.

In case where the retention catalyst is a reducing agent adsorption catalyst, too, similar to the case where the retention catalyst is a reducing agent adsorption oxidation catalyst, provision may further be made for a determination means that determines whether an amount of adsorption of the reducing agent in the reducing agent adsorption catalyst has exceeded an upper limit value of an allowable range. And, when it is determined by the determination means that the amount of adsorption of the reducing agent in the reducing agent adsorption catalyst has exceeded the upper limit value of the allowable range, the addition of the reducing agent by the reducing agent addition valve may be stopped. According to this, the reducing agent poisoning of the post-catalyst and the release of the reducing agent to the outside can be suppressed more effectively.

Effects of the Invention

According to the present invention, it is possible to raise the temperature of the post-catalyst at an early time while suppressing the reducing agent poisoning of the post-catalyst and the release of the reducing agent to the outside.

EXPLANATION OF SYMBOLS

1 . . . an internal combustion engine
2 . . . an exhaust passage
3 . . . an intake passage
4 . . . an oxidation catalyst
5 . . . a particulate filter
6 . . . an HC addition valve
9 . . . a first temperature sensor
10 . . . an ECU
13 . . . an HC adsorption oxidation catalyst
14 . . . an NOx catalyst.
15 . . . a second temperature sensor
16 . . . a third the temperature sensor Best Mode for Carrying Out the Invention Hereinafter, specific embodiments of an exhaust gas purification apparatus in an internal combustion engine according to the present invention will be described while referring to the accompanying drawings.

FIRST EMBODIMENT

Figure 1:
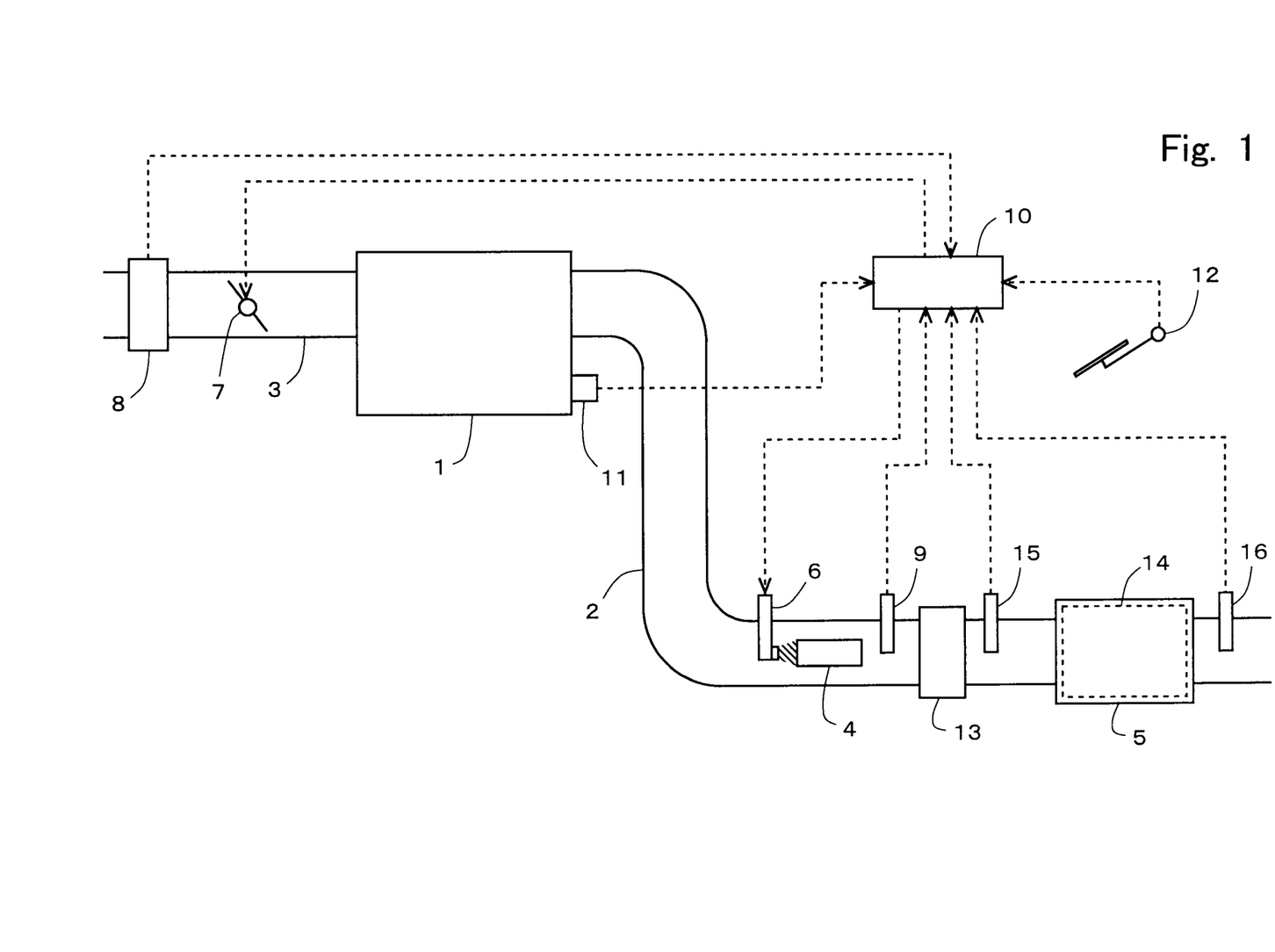
FIG. 1 This figure is a view illustrating the schematic construction of an intake and exhaust system in an internal combustion engine according to a first embodiment of the present invention.

Schematic Construction of an Intake and Exhaust System in an Internal Combustion Engine Here, reference will be made, by way of example, to the case where the present invention is applied to a diesel engine used for driving a vehicle. FIG. 1 is a view illustrating the schematic construction of an intake and exhaust system in an internal combustion engine according to this embodiment.

The internal combustion engine 1 is a diesel engine for driving a vehicle. An intake passage 2 and an exhaust passage 3 are connected with the internal combustion engine 1. A throttle valve 7 and an air flow meter 8 are arranged in the intake passage 3.

A particulate filter (hereinafter referred to as a filter) 5 for collecting particulate matter (hereinafter referred to as PM) in an exhaust gas is arranged in the exhaust passage 2. An NOx storage reduction catalyst (hereinafter referred to as an NOx catalyst) is carried on the filter 5.

An oxidation catalyst 4 is arranged in the exhaust passage 2 at a location upstream of the filter 5. The oxidation catalyst 4 is of a columnar shape, and has an outer diameter smaller than an inner diameter of the exhaust passage 2. In other words, the sectional area of the oxidation catalyst 4 in a vertical direction with respect to the direction in which the exhaust gas flows therein is smaller than the sectional area of the exhaust passage 2 in a vertical direction with respect to the direction in which the exhaust gas flows therein. According to such a construction, the exhaust gas flows between an outer peripheral surface of the oxidation catalyst 4 and an inner peripheral surface of the exhaust passage 2.

An HC adsorption oxidation catalyst 13 having an oxidation function and an HC adsorption function is arranged at a downstream side of the oxidation catalyst 4 in the exhaust passage 2 and at an upstream side of the filter 5.

Here, note that in this embodiment, the oxidation catalyst 4 corresponds to a pre-catalyst according to the present invention, and the NOx catalyst 14 corresponds to a post-catalyst according to the present invention, and the HC adsorption oxidation catalyst 13 corresponds to a retention catalyst according to the present invention or a reducing agent adsorption oxidation catalyst. A three way catalyst, an oxidation catalyst, an NOx catalyst, etc., can be used as the HC adsorption oxidation catalyst 13. In addition, the oxidation catalyst 4 and the NOx catalyst 14 each need only be a catalyst having an oxidation function.

An HC addition valve 6 for adding HC (fuel) as a reducing agent is arranged at a location immediately upstream of the oxidation catalyst 4 in the exhaust passage 2. HC is injected from the HC addition valve 6 toward an upstream end face of the oxidation catalyst 4 so that the added HC passes through the oxidation catalyst 4 (in FIG. 1, a shaded portion represents the atomization of fuel). As a result, almost all of the HC added from the HC addition valve 6 flows into the oxidation catalyst 4. Here, note that in this embodiment, the HC addition valve 6 corresponds to a reducing agent addition valve according to the present invention.

A first temperature sensor 9, a second temperature sensor 15 and a third the temperature sensor 16 for individually detecting the temperature of the exhaust gas are arranged between the oxidation catalyst 4 and the HC adsorption oxidation catalyst 13 in the exhaust passage 2, between the HC adsorption oxidation catalyst 13 and the filter 5, and at downstream side of the filter 5, respectively.

An electronic control unit (ECU) 10 for controlling the internal combustion engine 1 is provided in conjunction with the internal combustion engine 1 as constructed in the above-described manner. The air flow meter 8, the first temperature sensor 9, the second temperature sensor 15, the third temperature sensor 16, a crank position sensor 11, and an accelerator opening sensor 12 are electrically connected to the ECU 10. The output signals of these sensors are input to the ECU 10.

The crank position sensor 11 is a sensor that detects the crank angle of the internal combustion engine 1. The accelerator opening sensor 12 is a sensor that detects the degree of accelerator opening of the vehicle on which the internal combustion engine 1 is mounted. The ECU 10 calculates the engine rotation speed of the internal combustion engine 1 based on the output value of the crank position sensor 11, and also calculates the engine load of the internal combustion engine 1 based on the output value of the accelerator opening sensor 12.

In addition, the ECU 10 calculates the temperature of the oxidation catalyst 4 based on the detected value of the first temperature sensor 9, estimates the temperature of the HC adsorption oxidation catalyst 13 based on the detected value of the second temperature sensor 15, and calculates the respective temperatures of the filter 5 and the NOx catalyst 14 based on the detected value of the third temperature sensor 16. Here, note that in this embodiment, the respective temperatures of the catalysts 4, 13, 14 and the filter 5 can be estimated based on the operating condition of the internal combustion engine 1, the history of addition of HC from the HC addition valve 6, or the like without using the temperature sensors 9, 15, 16.

Moreover, the throttle valve 7, the HC addition valve 6, and fuel injection valves of the internal combustion engine 1 are electrically connected to the ECU 10. These valves are controlled by the ECU 10.

<NOx Catalyst Temperature Raising Control>

In this embodiment, when the NOx catalyst 14 in its unactivated state is caused to be activated, or when SOx occluded in the NOx catalyst 14 is released for reduction, or when PM collected in the filter 5 is oxidized to be removed, NOx catalyst temperature raising control for raising the temperature of the NOx catalyst 14 is executed.

The NOx catalyst temperature raising control according to this embodiment is achieved by adding HC from the HC addition valve 6. In this embodiment, as stated above, the sectional area of the oxidation catalyst 4 in the vertical direction with respect to the flow direction of the exhaust gas is smaller than the sectional area of the exhaust passage 2 in the vertical direction with respect to the flow direction of the exhaust gas. Therefore, the flow resistance of the exhaust gas at the time when the exhaust gas passes through the oxidation catalyst 4 in this embodiment is larger as compared with the case where the outer diameter of the oxidation catalyst 4 is equal to or larger than the inner diameter of the exhaust passage 2, and hence the flow rate of the exhaust gas flowing in the oxidation catalyst 4 is smaller. As a result, when HC is added from the HC addition valve 6, the time taken for the HC to pass through the oxidation catalyst 4 becomes longer, so the oxidation of the HC in the oxidation catalyst 4 is liable to be facilitated. As a result, the temperature rise of the exhaust gas is also liable to be facilitated.

In addition, in case where the HC added from the HC addition valve 6 slips or passes through the oxidation catalyst 4, the HC thus having slipped is adsorbed by the HC adsorption oxidation catalyst 13. The temperature of the HC adsorption oxidation catalyst 13 rises in accordance with the temperature rise of the oxidation catalyst 4. The HC adsorbed by the HC adsorption oxidation catalyst 13 is oxidized as the temperature of said the HC adsorption oxidation catalyst 13 rises. Therefore, even if the HC added from the HC addition valve 6 slips through the oxidation catalyst 4, it is possible to suppress the HC from reaching up to the filter 5.

Thus, according to this embodiment, the temperature of the NOx catalyst 14 can be raised at an early time while suppressing the HC poisoning of the NOx catalyst 14 as well as the release of HC to the outside.

Here, reference will be made to a method of adding HC from the HC addition valve 6 at the time of executing the NOx catalyst temperature raising control according to this embodiment. The higher the temperature of the oxidation catalyst 4, the higher the temperature of the exhaust gas flowing in the oxidation catalyst 4 also becomes, in accordance with which the coefficient of viscosity of the exhaust gas flowing in the oxidation catalyst 4 rises or increases. As a result, the higher the temperature of the oxidation catalyst 4, the smaller the flow rate of the exhaust gas passing in the oxidation catalyst 4 becomes even if the flow rate of the exhaust gas discharged from the internal combustion engine 1 is identical. Accordingly, at the time when HC is added from the HC addition valve 6, the higher the temperature of the oxidation catalyst 4, the longer the time taken for HC to pass through the oxidation catalyst 4 becomes. As a result, the oxidation of HC becomes more liable to be facilitated in the oxidation catalyst 4, so it becomes difficult for HC to slip through the oxidation catalyst 4.

Accordingly, in this embodiment, at the time of execution of the NOx catalyst temperature raising control, when the temperature of the oxidation catalyst 4 is lower than a first predetermined temperature, the addition of HC is executed by adjusting the amount of addition of HC per unit time to be less than that when the temperature of the oxidation catalyst 4 is equal to or higher than the first predetermined temperature. Here, the first predetermined temperature is a temperature at which it can be determined that the flow rate of the exhaust gas passing through the oxidation catalyst 4 is decreased by the increasing coefficient of viscosity of the exhaust gas flowing in the oxidation catalyst 4 whereby the amount of HC that can be oxidized in the oxidation catalyst 4 is increased to a satisfactory extent. Such a first predetermined temperature can be obtained beforehand based on experiments or the like.

According to this, the amount of HC slipping through the oxidation catalyst 4 can be suppressed. As a result, the HC poisoning of the NOx catalyst 14 and the release of HC to the outside can be suppressed more effectively.

In addition, according to the above, when the temperature of the oxidation catalyst 4 becomes equal to or higher than the first predetermined temperature after the start of the addition of HC from the HC addition valve 6, the amount of addition of HC per unit time is increased. Accordingly, the amount of heat generated due to the oxidation of HC in the oxidation catalyst 4 increases, as a result of which the temperature rise of the NOx catalyst 14 is facilitated. Therefore, the NOx catalyst 14 can be raised in temperature at a much earlier time.

Here, reference will be made to a routine for NOx catalyst temperature raising control according to this embodiment based on a flow chart shown in FIG. 2. This routine is stored in the ECU 10 beforehand, and is executed when a temperature raising execution condition for the NOx catalyst 14 holds.

In this routine, first in S101, the ECU 10 determines whether the temperature Tc of the oxidation catalyst 4 is equal to or higher than a lower limit value Tc0 of an activation temperature thereof. When a positive determination is made in S101, the ECU 10 proceeds to S102, whereas when a negative determination is made, the ECU 10 once terminates the execution of this routine.

In S102, the ECU 10 executes a minute addition of HC by means of the HC addition valve 6. The minute addition of HC according to this embodiment is an addition of HC that is executed by setting the amount of addition of HC per unit time to a first predetermined amount. Here, the first predetermined amount is an amount that is less than a second predetermined amount to be described later in the form of an amount of addition of HC per unit time after the temperature Tc of the oxidation catalyst 4 has become equal to or higher than a first predetermined temperature Tc1. The first predetermined amount is set as an amount at which the amount of HC slipping through the oxidation catalyst 4 falls within an allowable range even if the temperature Tc of the oxidation catalyst 4 is lower than the first predetermined temperature Tc1. Such a first predetermined amount can be obtained beforehand based on experiments or the like.

Then, the ECU 10 proceeds to S103, where it is determined whether the temperature Tc of the oxidation catalyst 4 is equal to or higher than the first predetermined temperature T1. When a positive determination is made in S103, the ECU 10 proceeds to S104. On the other hand, when a positive determination is made in S103, the ECU 10 returns to S102. In other words, the minute addition of HC is continued.

In S104, the ECU 10 increases the amount of addition of HC per unit time from the HC addition valve 6 to the second predetermined amount in S104. Here, the second predetermined amount can be set as a maximum amount of addition of HC within a range in which the amount of HC slipping through the oxidation catalyst 4 falls within an allowable range when the temperature Tc of the oxidation catalyst 4 is equal to or higher than the first predetermined temperature Tc1. Such a second predetermined amount can be obtained beforehand based on experiments or the like.

Then, the ECU 10 proceeds to S105, where it estimates an amount of adsorption Qab of HC in the HC adsorption oxidation catalyst 13, and determines whether the amount of adsorption Qab is equal to or less than an upper limit value Qlimit of the allowable range. The amount of adsorption Qab of HC in the HC adsorption oxidation catalyst 13 can be estimated based on the histories of the operating condition of the internal combustion engine 1, the amount of addition of HC from the HC addition valve 6, the temperature of the HC adsorption oxidation catalyst 13, and so on. In this regard, an HC sensor for detecting the concentration of HC in the exhaust gas can be arranged at a downstream side of the oxidation catalyst 4 and at an upstream side of the filter 5 in the exhaust passage 2, so that it may be determined based on the output value of the said HC sensor whether the amount of adsorption Qab of HC in the HC adsorption oxidation catalyst 13 is equal to or less than the upper limit value Qlimit of the allowable range. In S105, when an affirmative determination is made, the ECU 10 proceeds to S106, whereas when a negative determination is made, the ECU 10 proceeds to S107.

In S106, the ECU 10 determines whether the temperature Tn of the NOx catalyst 14 becomes equal to or higher than the target temperature Tnt. The target temperature Tnt is beforehand set according to the purpose of execution of the NOx catalyst temperature raising control. In S106, when an affirmative determination is made, the ECU 10 proceeds to S107, whereas when a negative determination is made, the ECU 10 returns to S105.

In S107, the ECU 10 stops the addition of HC from the HC addition valve 6. Thereafter, the ECU 10 ends the execution of this routine.

According to the routine described above, the amount of addition of HC per unit time from the HC addition valve 6 is changed before and after the timing at which the temperature Tc of the oxidation catalyst 4 becomes equal to or higher than the first predetermined temperature Tc1, as mentioned above.

In addition, according to the above-mentioned routine, when the amount of adsorption Qab in the HC adsorption oxidation catalyst 13 exceeds the upper limit value Qlimit of the allowable range, the addition of HC by the HC addition valve 6 is stopped. As a result, it is possible to suppress the HC slipping through the oxidation catalyst 4 from further slipping through the HC adsorption oxidation catalyst 13, too, to reach the NOx catalyst 14. Accordingly, the HC poisoning of the NOx catalyst 14 and the release of HC to the outside can be suppressed more effectively.

<HC Adsorption Oxidation Catalyst Temperature Raising Control>

In this embodiment, when the ability of oxidation of the HC adsorption oxidation catalyst 13 is increased, HC adsorption oxidation catalyst temperature raising control for raising the temperature of the HC adsorption oxidation catalyst 13 is executed. The HC adsorption oxidation catalyst temperature raising control according to this embodiment is achieved by adding HC from the HC addition valve 6, similar to the NOx catalyst temperature raising control.

According to this embodiment, at the time of execution of the HC adsorption oxidation catalyst temperature raising control, too, when the HC added from the HC addition valve 6 has slipped through the oxidation catalyst 4, the HC thus having slipped is adsorbed by the HC adsorption oxidation catalyst 13. In addition, the HC adsorbed by the HC adsorption oxidation catalyst 13 is oxidized due to the rising in temperature of the HC adsorption oxidation catalyst 13. Accordingly, the HC adsorption oxidation catalyst 13 can be raised in temperature at an early time while suppressing the HC poisoning of the NOx catalyst 14 and the release of HC to the outside.

In addition, at the time of execution of the HC adsorption oxidation catalyst temperature raising control according to this embodiment, HC is added according to a method similar to the method of adding HC from the HC addition valve 6 at the time of execution of the NOx catalyst temperature raising control. In other words, at the time of execution of the HC adsorption oxidation catalyst temperature raising control, when the temperature of the oxidation catalyst 4 is lower than the first predetermined temperature, the addition of HC is executed while adjusting the amount of addition of HC per unit time to be less than that when the temperature of the oxidation catalyst 4 is equal to or higher than the first predetermined temperature.

According to this, the amount of HC slipping through the oxidation catalyst 4 can be suppressed. Therefore, an increase in the amount of adsorption of HC in the HC adsorption oxidation catalyst 13 can be suppressed. As a result, the HC poisoning of the NOx catalyst 14 and the release of HC to the outside can be suppressed more effectively.

Moreover, according to the above, when the temperature of the oxidation catalyst 4 becomes equal to or higher than the first predetermined temperature after the start of the addition of HC from the HC addition valve 6, the amount of addition of HC per unit time is increased. Therefore, the HC adsorption oxidation catalyst 13 can be raised in temperature at a much earlier time.

Further, in this embodiment, at the time of execution of the HC adsorption oxidation catalyst temperature raising control, too, when the amount of adsorption Qab in the HC adsorption oxidation catalyst 13 exceeds the upper limit value Qlimit of the allowable range, the addition of HC by the HC addition valve 6 is stopped, as at the time of execution of the NOx catalyst temperature raising control.

SECOND EMBODIMENT

The schematic construction of an intake and exhaust system in an internal combustion engine according to this embodiment is similar to that in the first embodiment.

<NOx Catalyst Temperature Raising Control>

In this embodiment, too, the NOx catalyst temperature raising control is achieved by adding HC from the HC addition valve 6. Here, reference will be made to a method of adding HC from the HC addition valve 6 at the time of executing the NOx catalyst temperature raising control according to this embodiment. When the temperature of the oxidation catalyst 4 rises as HC is added from the HC addition valve 6, the temperature of the HC adsorption oxidation catalyst 13 accordingly rises, too. The ability of oxidation of the HC adsorption oxidation catalyst 13 increases as the temperature of the HC adsorption oxidation catalyst 13 rises.

Accordingly, in this embodiment, at the time of execution of the NOx catalyst temperature raising control, when the temperature of the HC adsorption oxidation catalyst 13 is lower than the second predetermined temperature, the addition of HC is executed by adjusting the amount of addition of HC per unit time to be less than that when the temperature of the HC adsorption oxidation catalyst 13 is equal to or higher than the second predetermined temperature. Here, the second predetermined temperature is a temperature at which it can be determined that the ability of oxidation of the HC adsorption oxidation catalyst 13 has been increased to a sufficient extent. Such a second predetermined temperature can be beforehand calculated based on experiments, etc.

According to this, the amount of HC slipping through the HC adsorption oxidation catalyst 13 can be suppressed. As a result, the HC poisoning of the NOx catalyst 14 and the release of HC to the outside can be suppressed more effectively.

In addition, according to the above, when the temperature of the HC adsorption oxidation catalyst 13 becomes equal to or higher than the second predetermined temperature after the start of the addition of HC from the HC addition valve 6, the amount of addition of HC per unit time is increased. As a result, the NOx catalyst 14 can be raised in temperature at a much earlier time.

Here, reference will be made to a routine for NOx catalyst temperature raising control according to this embodiment based on a flow chart shown in FIG. 3. This routine is stored in the ECU 10 beforehand, and is executed when a temperature raising execution condition for the NOx catalyst 14 holds. The flow chart shown in FIG. 3 is identical to the flow chart shown in FIG. 2 except for S102 through S104 being replaced with S202 through S204. Accordingly, only steps S202 through S204 will be described below while omitting the explanation of the other steps.

In this routine, when an affirmative determination is made in S101, the ECU 10 proceeds to S202. In S202, the ECU 10 executes a minute addition of HC by means of the HC addition valve 6. The minute addition of HC according to this embodiment is the addition of HC that is executed by setting the amount of addition of HC per unit time to a third predetermined amount. Here, the third predetermined amount is an amount that is less than a fourth predetermined amount to be described later in the form of an amount of addition of HC per unit time after the temperature Tab of the HC adsorption oxidation catalyst 13 has become equal to or higher than a second predetermined temperature Tab2. The third predetermined amount is set as an amount at which the amount of HC slipping through the adsorption oxidation catalyst 13 falls within an allowable range even if the temperature Tab of the adsorption oxidation catalyst 13 is lower than the second predetermined temperature Tab2. Such a third predetermined amount can be obtained beforehand based on experiments or the like.

Then, the ECU 10 proceeds to S203, wherein it determines whether the temperature Tab of the HC adsorption oxidation catalyst 13 is equal to or higher than the second predetermined temperature Tab2. When an affirmative determination is made in S203, the ECU 10 proceeds to S204. On the other hand, when a negative determination is made in S203, the ECU 10 returns to S202. In other words, the minute addition of HC is continued.

In S204, the ECU 10 increases the amount of addition of HC per unit time from the HC addition valve 6 to the fourth predetermined amount. Here, the fourth predetermined amount can be set as a maximum amount of addition of HC within a range in which the amount of HC slipping through the oxidation catalyst 4 and the adsorption oxidation catalyst 13 falls within an allowable range when the temperature Tab of the adsorption oxidation catalyst 13 is equal to or higher than the second predetermined temperature Tab2. Such a fourth predetermined amount can be obtained beforehand based on experiments or the like. The ECU 10 proceeds to S105 after S204.

According to the routine described above, the amount of addition of HC per unit time from the HC addition valve 6 is changed as mentioned above before and after the timing at which the temperature Tab of the HC adsorption oxidation catalyst 13 becomes equal to or higher than the second predetermined temperature Tab2.

In addition, at the time of execution of the NOx catalyst temperature raising control according to this embodiment, too, when the amount of adsorption Qab in the HC adsorption oxidation catalyst 13 exceeds the upper limit value Qlimit of the allowable range, the addition of HC by the HC addition valve 6 is stopped.

THIRD EMBODIMENT

The schematic construction of an intake and exhaust system in an internal combustion engine according to this embodiment is similar to that in the first embodiment.
<NOx Catalyst Temperature Raising Control>

Figure 4:
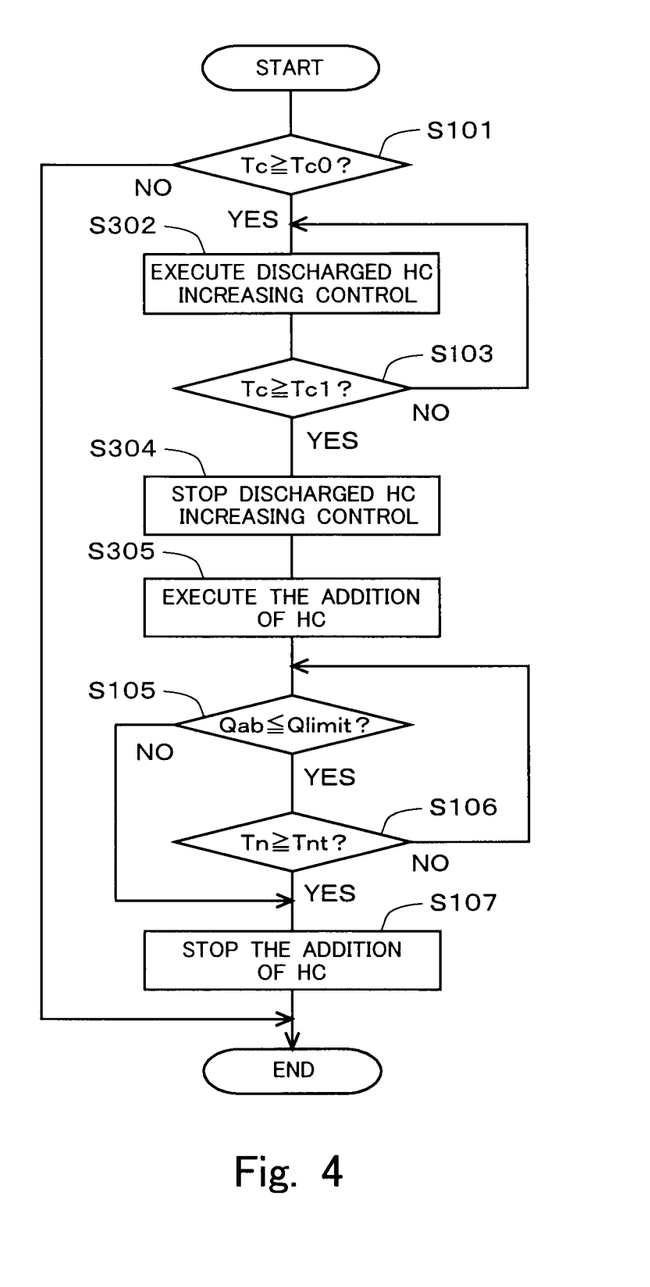
FIG. 4 This figure is a flow chart illustrating an NOx catalyst temperature raising control routine according to a third embodiment.

Hereinafter, reference will be made to a routine for NOx catalyst temperature raising control according to this embodiment based on a flow chart shown in FIG. 4. This routine is stored in the ECU 10 beforehand, and is executed when a temperature raising execution condition for the NOx catalyst 14 holds. The flow chart shown in FIG. 4 is identical to the flow chart shown in FIG. 2 except for S102 and S104 therein being replaced with S302, S304 and S305. Accordingly, only steps S302, S304 and S305 will be described below while omitting the explanation of the other steps.

In this routine, when an affirmative determination is made in S101, the ECU 10 proceeds to S302. In S302, the ECU 10 executes discharged HC increasing control that increases the amount of the HC discharged from the internal combustion engine 1. As the discharged HC increasing control according to this embodiment, there can be exemplified the control of decreasing the amount of intake air in the internal combustion engine 1, the control of retarding the fuel injection timing in the internal combustion engine 1, etc. At this time, the addition of HC from the HC addition valve 6 is not carried out. The ECU 10 proceeds to S103 following S302.

In this embodiment, when an affirmative determination is made in S103, the ECU 10 proceeds to S304. In S304, the ECU 10 stops the discharged HC increase control.

Then, the ECU 10 proceeds to S305, where it executes the addition of HC from the HC addition valve 6. Thereafter, the ECU 10 proceeds to S105.

According to the routine described above, the amount of HC discharged from the internal combustion engine 1 increases until the temperature Tc of the oxidation catalyst 4 becomes equal to or higher than the first predetermined temperature Tc1, so the amount of HC supplied to the oxidation catalyst 4 increases. Thus, the temperature Tc of the oxidation catalyst 4 is raised due to the oxidation of the HC being carried out in the oxidation catalyst 4.

In this embodiment, that portion of the HC discharged from the internal combustion engine 1 which has not flowed into the oxidation catalyst 4 is adsorbed by the HC adsorption oxidation catalyst 13. The temperature of the HC adsorption oxidation catalyst 13 rises in accordance with the temperature rise of the oxidation catalyst 4, whereby the HC adsorbed by the HC adsorption oxidation catalyst 13 is oxidized. Therefore, even in case where the HC discharged by internal combustion engine 1 is increased so as to increase the amount of HC supplied to the oxidation catalyst 4, the HC poisoning of the NOx catalyst 14 and the release of HC to the outside are suppressed.

In addition, in the above-mentioned routine, too, when the temperature Tc of the oxidation catalyst 4 becomes equal to or higher than the first predetermined temperature Tc1, the addition of HC from the HC addition valve 6 is carried out. As a result, the temperature rise of the NOx catalyst 14 is facilitated.

Accordingly, by the NOx catalyst temperature raising control according to this embodiment, too, the NOx catalyst 14 can be raised in temperature at an earlier time while suppressing the HC poisoning of the NOx catalyst 14 and the release of HC to the outside.
<HC Adsorption Oxidation Catalyst Temperature Raising Control>

In this embodiment, in the HC adsorption oxidation catalyst temperature raising control, too, the discharged HC increase control is carried out without performing the addition of HC from the HC addition valve 6 until the temperature Tc of the oxidation catalyst 4 becomes equal to or higher than the first predetermined temperature Tc1. Then, when the temperature Tc of the oxidation catalyst 4 becomes equal to or higher than the first predetermined temperature Tc1, the discharged HC increase control is stopped and the addition of HC from the HC addition valve 6 is executed.

By the HC adsorption oxidation catalyst temperature raising control according to this embodiment, too, the HC adsorption oxidation catalyst 13 can be raised in temperature at an earlier time while suppressing the HC poisoning of the NOx catalyst 14 and the release of HC to the outside.

FOURTH EMBODIMENT

Figure 5:
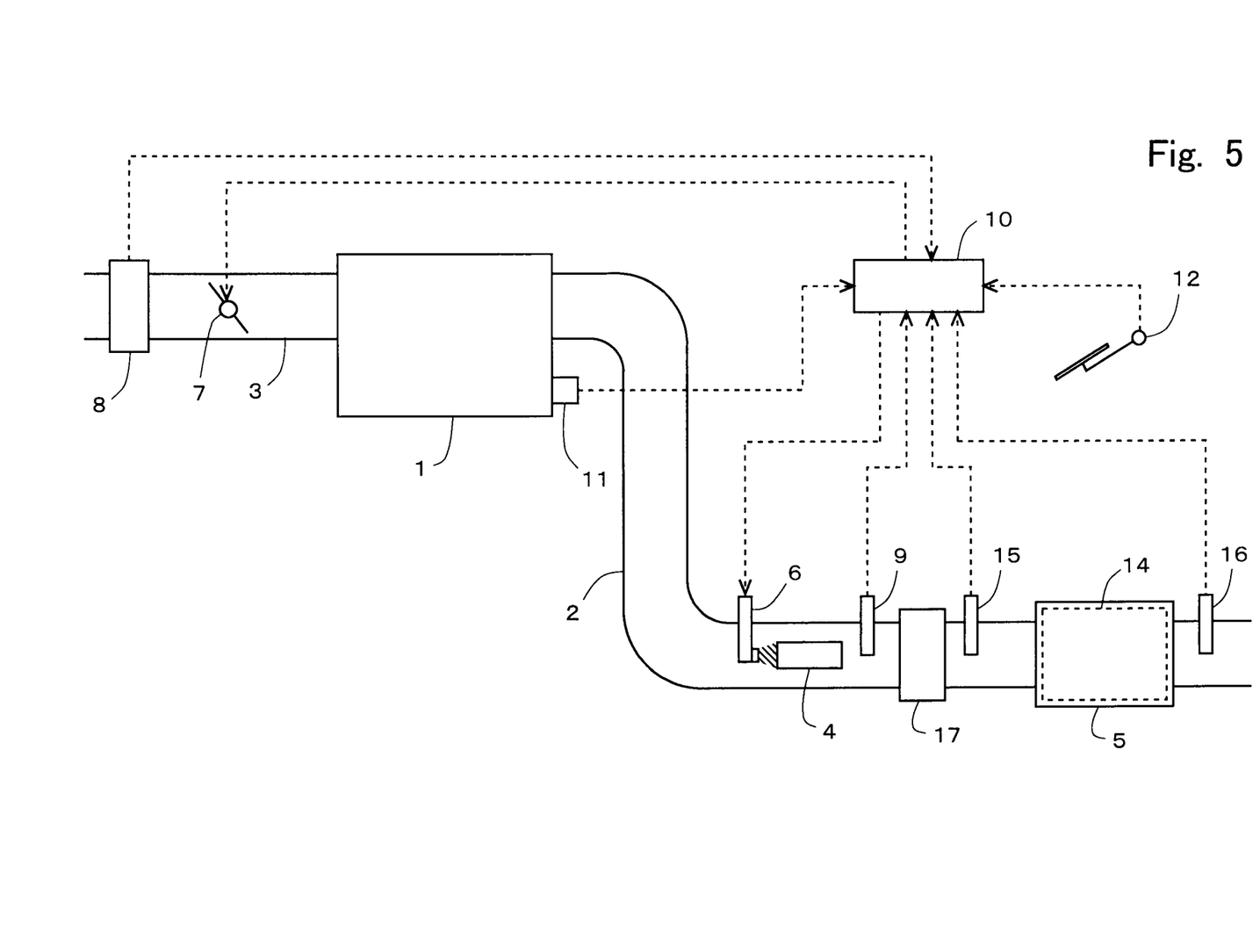
FIG. 5 This figure is a view illustrating the schematic construction of an intake and exhaust system in an internal combustion engine according to a fourth embodiment of the present invention.

Schematic Construction of an Intake and Exhaust System in an Internal Combustion Engine FIG. 5 is a view showing the schematic construction of an intake and exhaust system in an internal combustion engine according to this embodiment. The construction according to this embodiment is identical to that according to the first embodiment except for the HC adsorption oxidation catalyst 13 therein being replaced with an HC adsorption catalyst 17.

The HC adsorption catalyst 17 is a catalyst that does not has an oxidation function, but has a function to adsorb HC in the exhaust gas when the temperature thereof is equal to or less than an adsorption temperature upper limit value, and to release the HC thus adsorbed when the temperature thereof is higher than the adsorption temperature upper limit value. As the HC adsorption catalyst 17, there can be exemplified an NOx selective reduction catalyst that selectively reduces NOx in the exhaust gas by the use of ammonia as a reducing agent. In case where the an NOx selective reduction catalyst is used as the HC adsorption catalyst 17, a urea addition valve for supplying urea to the HC adsorption catalyst 17 can be arrange in the exhaust passage 2. Here, note that in this embodiment, the HC adsorption catalyst 17 corresponds to a retention catalyst or a reducing agent adsorption catalyst according to the present invention.
<NOx Catalyst Temperature Raising Control>

In this embodiment, too, the NOx catalyst temperature raising control is achieved by adding HC from the HC addition valve 6. In addition, in this embodiment, the routine for the NOx catalyst temperature raising control shown in FIG. 2 is stored in the ECU 10 beforehand, similar to the first embodiment, and the NOx catalyst temperature raising control is achieved by performing this routine.

In this embodiment, at the time when the temperature of the HC adsorption catalyst 17 is equal to or lower than the adsorption temperature upper limit value, in case where the HC added from the HC addition valve 6 slips or passes through the oxidation catalyst 4, the HC thus having slipped is adsorbed by the HC adsorption catalyst 17. As a result, the HC poisoning of the NOx catalyst 14 and the release of HC to the exterior are suppressed.

Then, when the temperature of the HC adsorption catalyst 17 goes upward in accordance with the temperature rise of the oxidation catalyst 4, the HC adsorbed by the HC adsorption catalyst 17 is released, so that the HC thus released is supplied to the NOx catalyst 14. At this time, the temperature of the NOx catalyst 14 rises in accordance with the temperature rise of the oxidation catalyst 4. Therefore, the HC supplied to the NOx catalyst 14 is oxidized in the NOx catalyst 14. As a result, the temperature rise of the NOx catalyst 14 is facilitated.

Thus, according to this embodiment, too, the temperature of the NOx catalyst 14 can be raised at an early time while suppressing the HC poisoning of the NOx catalyst 14 and the release of HC to the outside.

Figure 2:
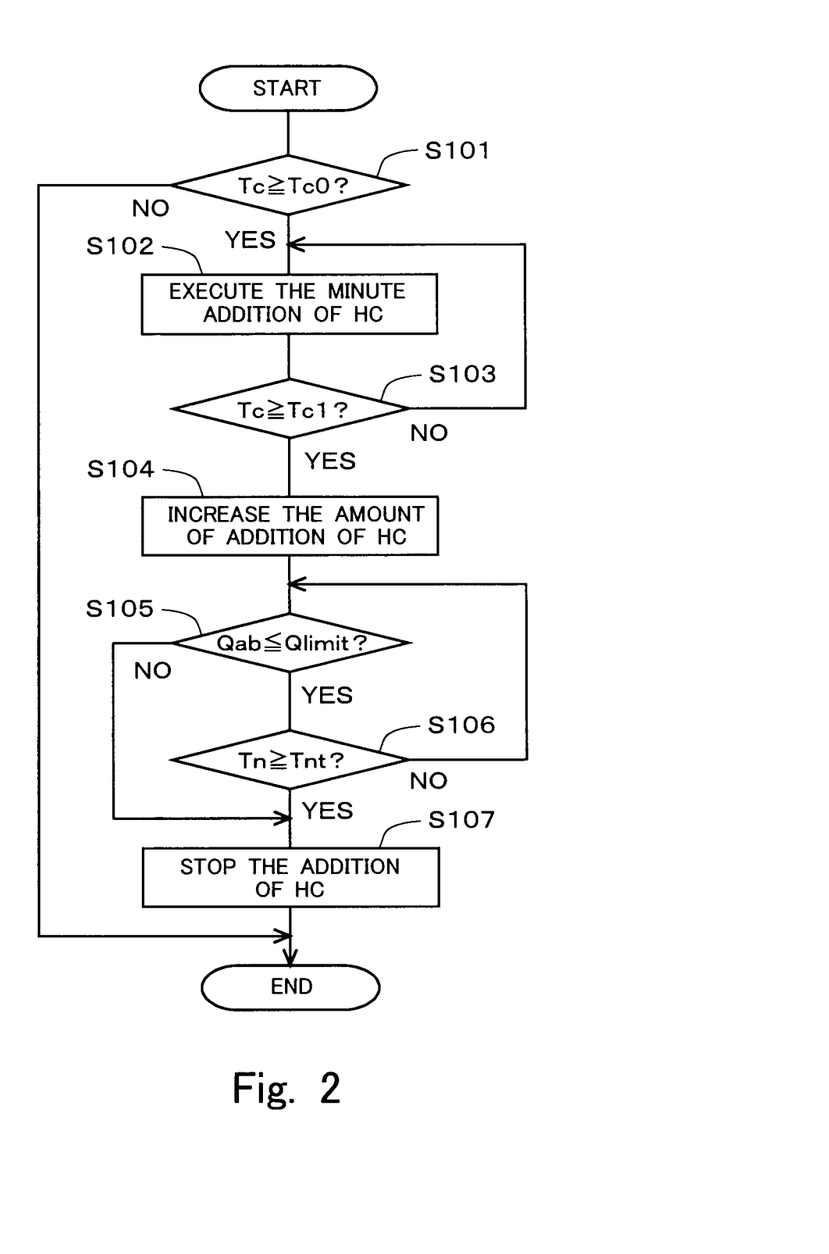
FIG. 2 This figure is a flow chart illustrating an NOx catalyst temperature raising control routine according to the first embodiment.
Figure 3:
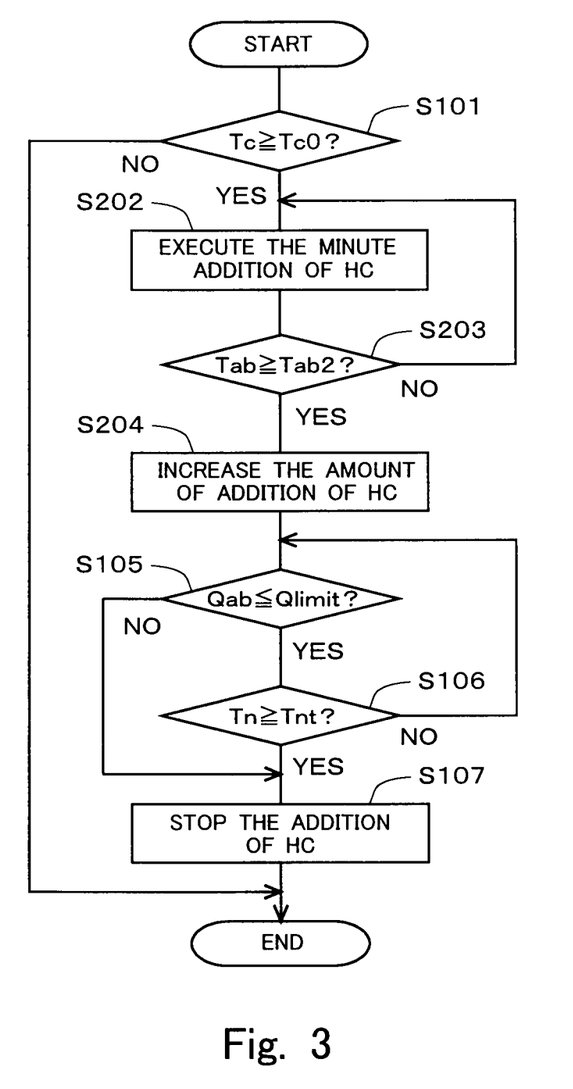
FIG. 3 This figure is a flow chart illustrating an NOx catalyst temperature raising control routine according to a second embodiment.

In addition, in this embodiment, too, by performing the NOx catalyst temperature raising control according to the routine shown in FIG. 2, similar effects as in the case of the first embodiment can be achieved.

FIFTH EMBODIMENT

The schematic construction of an intake and exhaust system in an internal combustion engine according to this embodiment is similar to that in the fourth embodiment.
<NOx Catalyst Temperature Raising Control>

In this embodiment, the routine for the NOx catalyst temperature raising control shown in FIG. 4 is stored in the ECU 10 beforehand, similar to the third embodiment, and the NOx catalyst temperature raising control is achieved by performing this routine.

In this embodiment, too, that portion of the HC discharged from the internal combustion engine 1 which has not flowed into the oxidation catalyst 4 is once adsorbed by the HC adsorption catalyst 17. Then, when the temperature of the HC adsorption catalyst 17 becomes higher than the adsorption temperature upper limit value in accordance with the temperature rise of the oxidation catalyst 4, the HC thus adsorbed is released. At this time, the temperature of the NOx catalyst 14 also rises in accordance with the temperature rise of the oxidation catalyst 4. Therefore, the released HC is supplied to the NOx catalyst 14 of which the temperature has risen. Accordingly, the HC thus supplied is oxidized in the NOx catalyst 14.

Thus, according to this embodiment, too, the temperature of the NOx catalyst 14 can be raised at an earlier time while suppressing the HC poisoning of the NOx catalyst 14 and the release of HC to the outside, as in the case of the third embodiment.

Here, note that in the above-mentioned respective embodiments, there can be adopted a construction in which another catalyst such as an NOx catalyst or the like is further arranged in the exhaust passage 2 at an upstream side of the oxidation catalyst 4.

The above-mentioned respective embodiments can be combined with one another as long as such combinations are possible.

The invention claimed is:

1. An exhaust gas purification apparatus in an internal combustion engine comprising:
a pre-catalyst that has an oxidation function and is arranged in an exhaust passage of the internal combustion engine in such a manner that an exhaust gas can flow through between an outer peripheral surface thereof and an inner peripheral surface of said exhaust passage;
a post-catalyst that has an oxidation function and is arranged in said exhaust passage at a downstream side of said pre-catalyst;
a reducing agent addition valve that is arranged at a location immediately upstream of said pre-catalyst in said exhaust passage, and adds, when raising the temperature of said post-catalyst, a reducing agent in such a manner that said reducing agent passes through said pre-catalyst;
a retention catalyst that is arranged at a downstream side of said pre-catalyst and at an upstream side of said post-catalyst in said exhaust passage, and has a function to temporarily retain said reducing agent in said exhaust gas; and
an electronic control unit including a routine for exhaust gas purification control, the routine, when executed by the electronic control unit, performing the steps of:
executing discharged HC increasing control that increases an amount of HC discharged from said internal combustion engine without adding said reducing agent from said reducing agent addition valve until the temperature of said pre-catalyst becomes equal to or higher than a first predetermined temperature, and
making said reducing agent addition valve add said reducing agent after the temperature of said pre-catalyst becomes equal to or higher than said first predetermined temperature, when said post-catalyst is raised in temperature and when the temperature of said pre-catalyst is equal to or higher than a lower limit value of an activation temperature thereof.

2. The exhaust gas purification apparatus in an internal combustion engine as set forth in claim 1, wherein said retention catalyst is a reducing agent adsorption oxidation catalyst that has an oxidation function and a reducing agent adsorption function.

3. The exhaust gas purification system in an internal combustion engine as set forth in claim 2, wherein the routine, when executed by the electronic control unit, performs the steps of:
determining whether an amount of adsorption of said reducing agent in said reducing agent adsorption oxidation catalyst has exceeded an upper limit value of an allowable range; and
stopping said reducing agent addition valve from adding said reducing agent when it is determined that the amount of adsorption of said reducing agent in said reducing agent adsorption oxidation catalyst has exceeded the upper limit value of said allowable range.

4. The exhaust gas purification apparatus in an internal combustion engine as set forth in claim 1, wherein said retention catalyst is a reducing agent adsorption catalyst that has a function to adsorb said reducing agent in said exhaust gas when the temperature thereof is equal to or lower than an adsorption temperature upper limit value, and to release the reducing agent thus adsorbed when the temperature thereof is higher than said adsorption temperature upper limit value.

5. The exhaust gas purification system in an internal combustion engine as set forth in claim 1, wherein the routine, when executed by the electronic control unit, performs the steps of:
determining whether an amount of adsorption of said reducing agent in said reducing agent adsorption catalyst has exceeded an upper limit value of an allowable range; and
stopping said reducing agent addition valve from adding said reducing agent when it is determined that the amount of adsorption of said reducing agent in said reducing agent adsorption catalyst has exceeded the upper limit value of said allowable range.

6. The exhaust gas purification apparatus in an internal combustion engine as set forth in claim 1, wherein said first predetermined temperature is a temperature at which the flow rate of the exhaust gas passing through said pre-catalyst is decreased due to an increasing coefficient of viscosity of the exhaust gas flowing in said pre-catalyst, by which it can be determined that the amount of reducing agent which can be oxidized in said pre-catalyst has been increased to a sufficient extent.

7. An exhaust gas purification apparatus in an internal combustion engine comprising:
a pre-catalyst that has an oxidation function and is arranged in an exhaust passage of the internal combustion engine in such a manner that an exhaust gas can flow through between an outer peripheral surface thereof and an inner peripheral surface of said exhaust passage;
a post-catalyst that has an oxidation function and is arranged in said exhaust passage at a downstream side of said pre-catalyst;
a reducing agent addition valve that is arranged at a location immediately upstream of said pre-catalyst in said exhaust passage, and adds, when raising the temperature of said post-catalyst, a reducing agent in such a manner that said reducing agent passes through said pre-catalyst;
a retention catalyst that is arranged at a downstream side of said pre-catalyst and at an upstream side of said post-catalyst in said exhaust passage, and has a function to temporarily retain said reducing agent in said exhaust gas, said retention catalyst being a reducing agent adsorption oxidation catalyst that has an oxidation function and a reducing agent adsorption function; and
an electronic control unit including a routine for exhaust gas purification control, the routine, when executed by the electronic control unit, performing the steps of:
making said reducing agent addition valve add said reducing agent in such a manner that said reducing agent passes through said pre-catalyst, when said reducing agent adsorption oxidation catalyst is raised in temperature,
executing discharged HC increasing control that increases an amount of HC discharged from said internal combustion engine without adding said reducing agent from said reducing agent addition valve until the temperature of said pre-catalyst becomes equal to or higher than a first predetermined temperature, and
make said reducing agent addition valve add said reducing agent after the temperature of said pre-catalyst becomes equal to or higher than said first predetermined temperature, when said reducing agent adsorption oxidation catalyst is raised in temperature and when the temperature of said pre-catalyst is equal to or higher than a lower limit value of an activation temperature thereof.

8. The exhaust gas purification apparatus in an internal combustion engine as set forth in claim 7, wherein said first predetermined temperature is a temperature at which the flow rate of the exhaust gas passing through said pre-catalyst is decreased due to an increasing coefficient of viscosity of the exhaust gas flowing in said pre-catalyst, by which it can be determined that the amount of reducing agent which can be oxidized in said pre-catalyst has been increased to a sufficient extent.

* * * * *